United States Patent
Sohrabi et al.

(10) Patent No.: US 8,046,278 B2
(45) Date of Patent: Oct. 25, 2011

(54) PROCESS OF SELECTING PORTFOLIO MANAGERS BASED ON AUTOMATED ARTIFICIAL INTELLIGENCE TECHNIQUES

(76) Inventors: Mohsen Sohrabi, Geneva (CH); Esfandiar Sorouchyari, Lausanne (CH)

( * ) Notice: Subject to any disclaimer, the term of this patent is extended or adjusted under 35 U.S.C. 154(b) by 2429 days.

(21) Appl. No.: 10/284,718

(22) Filed: Oct. 31, 2002

(65) Prior Publication Data

US 2003/0084014 A1    May 1, 2003

Related U.S. Application Data

(60) Provisional application No. 60/334,698, filed on Nov. 1, 2001.

(51) Int. Cl.
    *G06Q 40/00* (2006.01)
(52) U.S. Cl. .................. 705/35; 705/37; 705/14.25
(58) Field of Classification Search .............. 705/35, 705/37, 14.25
    See application file for complete search history.

(56) References Cited

U.S. PATENT DOCUMENTS 3,628,904 A * 12/1971 Canguilhem .................. 705/7
5,675,746 A * 10/1997 Marshall ...................... 705/35

OTHER PUBLICATIONS

Applying Artificial Neural Networks to Investment Analysis Swales, George S., Jr., Yoon, Young. Financial Analysts Journal. Charlottesville: Sep./Oct. 1992. vol. 48, Iss. 5; p. 78 (3 pages).*
www.scholarpedia.org/article/Kohonen_network.*

* cited by examiner

*Primary Examiner* — Daniel Felten
(74) *Attorney, Agent, or Firm* — Moetteli & Associés Sàrl

(57) ABSTRACT

A method and a system applying data mining techniques and artificial intelligence algorithms, namely neural networks, operating via an Internet data exchange site, allowing portfolio management companies to access an on-line, standardized questionnaire (Request for Proposal) and present their capabilities. The method then analyses a large number of these questionnaires and classifies managers, categorizing them and ranking their capabilities. In addition, sponsors such as pension funds, endowments, and private clients can submit their offer for the management of their assets. The site provides a Request for Proposal that is modular and continuously adapted to new financial market conditions, legal considerations and Sponsors needs. Once completed by each manager, the questionnaire is maintained in a central database allowing each manager to have an up-to-date and on-line version of questionnaire. The site allows the manager to have access to offers for new mandates in an easier and more efficient way than the old approach that involves approaching each potential Sponsor individually in a time and money consuming manner. The site provides Sponsors the opportunity to request proposals for their mandate from a much higher number of management companies, thus increasing dramatically the efficiency and rationality of their final choice of managers.

17 Claims, 20 Drawing Sheets

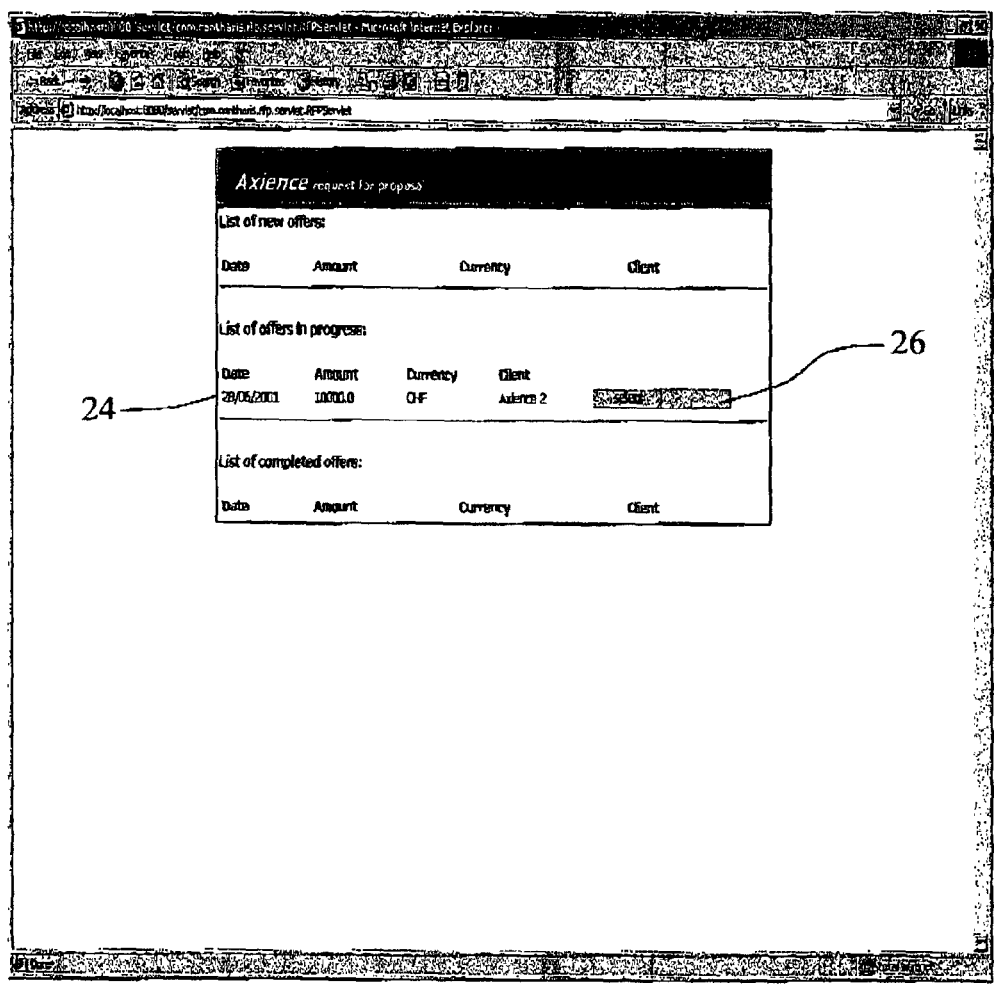

Fig.5

```
<categoryList>
    <categories type="Firm Name, Address and Contacts" url="21">
      <category>
        <title>Firm Name, Address and Contacts</title>
        <url>21</url>
      </category>
    </categories>
    <categories type="Ownership and Affiliates" url="22">
      <category>
        <title>Ownership and Affiliates</title>
        <url>22</url>
      </category>
      <category>
        <title>History</title>
        <url>23</url>
      </category>
    </categories>
    <categories type="Organisation" url="24">
      <category>
        <title>Organisation</title>
        <url>24</url>
      </category>
      <category>
        <title>Business Plan</title>
        <url>25</url>
      </category>
      <category>
        —
      </category>
      ....
</categoryList>
```
— 40

Step 1 of 56

70) Name of the firm: [          ]

Fig.7

82) If yes, please specify:
- Marketing arrangements ☐
- Products distribution ☐
- Fund management ☐
- Research arrangements ☐
- Trading arrangements ☐
- Consultants ☐
- Others (please specify) [_____]

85) The Firm is owned by :

|  | Since Year | Percentage (%) |
|---|---|---|
| Management of Firm |  |  |
| Management and employees |  |  |
| Investors in stock market |  |  |

1. The sponsor specifies the type of mandate
2. The adequate RFP is sent to the management firms through the internet
3. Portfolio managers fill in the RFP with the verification provided by the WEB application.
4. The completed RFP is sent back to the central system
5. The central system stores the completed RFP in the database 1. The central system retrieves the completed RFPs.
2. The analysis calculations are performed by the system.
3. The analysis results are stored in the central database.
4. The analysis reports are made available through the internet.
5. The results are displayed by the Data Analysis Application.

Average dimension of firm no 3 → 154

Average dimension $D_3$ of the firm sample

← 152

150

PROCESS OF SELECTING PORTFOLIO MANAGERS BASED ON AUTOMATED ARTIFICIAL INTELLIGENCE TECHNIQUES

RELATED DOCUMENTS

Applicants have filed a document under the disclosure document program, DD No. 474412, and claim priority to U.S. Provisional patent application No. 60/334,698, filed Nov. 1, 2001, the content of which are incorporated herein by reference hereto.

BACKGROUND OF THE INVENTION

The invention relates to an evaluation method, in particular, to a method of selecting an investment manager.

Traditionally, the process of selecting an investment manager includes several steps. In a first step, a "long list" of Managers invited to bid for the mandate is established. The length of the list is limited because of the cost involved in processing even superficially. In a second step, questionnaires are sent to each potential manager. Questionnaires are not standardized and the risk of misinterpretation is high. In a third step, the numerical and textual answers to the questionnaire are analyzed to identify a short list of finalist managers. The analysis is partly computerized and partly performed by human analysts and thus influenced by subjective interpretations. Therefore, it is often not clear exactly why some managers do not appear on the short list. In a fourth step, the shortlisted managers are interviewed. In a fifth step, the decision is made as to which Manager is the most appropriate given all the particularities of the Sponsor.

Investorforce, a company based in Wayne, Pa., operates a website (investorforce.com) which offers the state of the art in manager search. It is one of a number of new providers that use Internet technology to streamline the process and enhance some aspect of the search process. According to their website, through InvestorForce's service called SEARCH EXCHANGE™, institutional investors can "submit customized RFPs online to which investment managers can respond . . . . The institutional investor then narrows the candidates to a group of finalists . . . . Throughout the process, the investor can compare performance data through side-by-side charts and graphs and can analyze responses to customized inquiries from investment managers to reach a decision."

Thanks to these new providers, the cost of due diligence (applying the above-mentioned points) in the search for managers (in particular, the analysis of answers phase) has been considerably reduced. At the same time, a much larger number of potential managers can compete for a given mandate, and thus the likelihood of selecting better managers has improved. Furthermore, from the standpoint of the investment management industry, the cost of searching for new clients has been reduced. Although it is not yet used universally, this type of Internet-based manager search is growing rapidly.

In order to decide which manager(s) is the most appropriate, the investor still needs to go beyond the analysis offered by the new providers. For example, let's assume that "CalPERS", the largest US pension find, decides to utilize the search exchange capability of Wayne, Pa.'s InvestorForce.com to complete the competitive search process online in early January. A selection is not expected to be made final before late March. Thus, in order to appoint 5 to 10 managers in such a case, 3 further months of analysis are necessary to complete the search.

The new providers have been able to improve the manager selection process each time numerical data was involved. However, as experts familiar with this industry well know, the selection of investment managers cannot solely depend on the analysis of pure data.

Recognizing this fact, several new providers also provide non-numerical information in a somewhat standardized format. But the information still has to be screened, analysed and compared by traditional mostly human approaches. The drawbacks of this approach are, among others, the limited number of managers that can be analyzed and compare, the high cost of human analysis, the time it takes to perform the analysis and the risks associated with the subjectivity of the process. What is needed therefore is a method that can reveal the similarities between a large sample of competing firms in a more scientific, objective manner.

SUMMARY OF THE INVENTION

A computerized system is provided, based on an Internet data exchange site where portfolio management companies can access an on-line, standardized questionnaire and present their capabilities and Sponsors (as defined hereafter under "3. Technical and Functional Overview") such as pension funds, endowments, and private clients can submit their offer for the management of their assets. The site provides an on-line questionnaire (Request For Proposal or "RFP") that is modular and continuously adapted to new financial market conditions, legal considerations and sponsor needs. The questionnaire, completed by each manager, will be maintained in a central database allowing each manager to have an up-to-date and on-line version of questionnaire. The site allows the manager to have access to offers for new mandates in an easier and more efficient way than the prior art method which involves approaching each potential Sponsor individually (which is tine consuming and expensive).

The System provides the opportunity for Sponsors to request proposals for their mandate from a much higher number of pre-qualified management companies thus increasing dramatically the efficiency and rationality of their final choice of managers.

The design of the on-line questionnaire is such that the method of the invention can automatically analyse the responses. This software, based on data mining techniques and artificial intelligence algorithms namely neural networks, is capable of analysing a large number of questionnaires and of classifying managers in different categories with a ranking of their capabilities. These categories and ranking are then presented in comprehensive, mostly graphical form to the Sponsor.

The method of the invention processes a large number of data contained in the questionnaire and generates a set of traceable categories that bring together the most important information and therefore, render the process of final decision-making much faster, more efficient and less subjective.

In an advantage of the invention, the method ensures that the selection process is rapid and made on a transparent, objective, sound and scientific basis. Therefore the invention tends to improve the logic and coherence of the final choice considering the predefined selection criteria of the investor as well as the criteria that cannot be readily expressed quantitatively.

In a second advantage, the invention highlights all the reasons (pros & cons) involved in a decision which translates into a level of transparency impossible to achieve trough traditional, mostly subjective human methods. This is especially so when a large number of possible managers are involved in the selection process. Thus, the method of the invention helps avoid making a final decision without adequate consideration of an important selection criteria. The method also helps avoid decisions that might conflict with the best interest of the investor.

In a third advantage, the invention highlights the different selection criteria among managers participating in a selection process.

In a fourth advantage, the invention provides a tool to ensure that the reasons for the hiring of a Manager are objective and remain valid over time. For the portfolio management industry, this objectivity also guarantees a fair treatment for every bidder. At the same time, a more open market will translate into improved quality for the consumer, in this case the investor.

BRIEF DESCRIPTION OF THE DRAWINGS

FIG. 2 is an example of XML syntax in which XSL scripts are used to transform XML descriptions into web pages subsequently sent to a manager.

FIG. 3 is a screen print of a web page interface of the invention.

FIG. 5 shows an XML sequence of the invention that describes the different modules in the menu of FIG. 4.

FIG. 6 is an example of atomic questions having only one answer.

FIG. 7 is an example of vector questions, meaning that the question can have a set of possible answers.

FIG. 8 is an example of matrix questions meaning that the user has to complete a bi-dimensional structure.

DETAILED DESCRIPTION OF THE PREFERRED EMBODIMENT

Figure 1A:
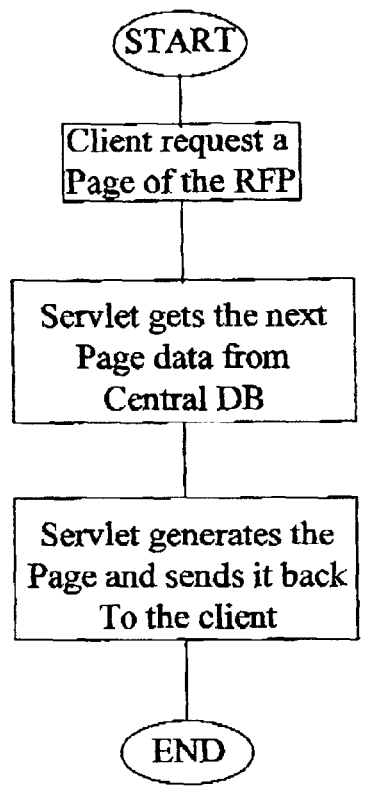
FIG. 1A is a flow chart showing the dynamic generation of a webpage using a servlet.

This description is best understood in light of definitions of the terms "Sponsor" and "Manager", which have the following meaning, unless expressly stated otherwise herein:

"Sponsor" refers to a sponsor of the selection process and includes, but is not be limited to, pension funds, foundations, endowments, institutions, insurance companies, family funds, portfolio management firms, private persons which desire to have their funds be invested by portfolio managers.

"Portfolio management firms" include those who use the services of outside portfolio managers to manage part or all of their client's assets.

"Manager" includes, but is not limited to, banks, independent asset managers, asset management companies, insurance companies that provide asset management capabilities to their clients.

The present invention is implemented by a computerized, Internet based method permitting a secure communications and secure information exchange. The method enables a Sponsor to submit a "mandate" and request a proposal from a number of managers by means of an on-line questionnaire or request for proposal (RFP). The method allows the Sponsor to qualify the best managers that correspond to his requirements and ultimately leads to the appointment of one or several managers. The invention is referred to herein as a "method", or a "system" and the use of one term and not the other is not to be taken as an exclusion of the other.

The system and method of the invention provide various functions to the users. The principal functions are described below.

On the Manager's Side

On the manager side, the system is preferably accessed via an Internet connection and a web browser. Of course, the method of the invention operates on other networks as well. For example, the method is capable of operating on a virtual private network, a LAN/intranet and an extranet. Upon input of the proper URL, access to the functional interface of the System is subject to validation through the input of a correct username and password. Upon the entry of the correct login information, a secure port is opened and all communications between the manager and the system are encrypted.

The secure connection to the site and identification of the manager enables the system to send to the manager secure, targeted information concerning the mandates that have been submitted by the Sponsors. Such information is usually in the form of a hypertext link list to further detailed information about each mandate. Further, the list leads directly or indirectly to a corresponding RP that the manager can complete.

The web pages presented to the user via their web browser are dynamically regenerated by the server. This means that periodic refresh commands are generated on the server side, to ensure that the manager has the latest information available concerning the mandate. This means that any change in the RFP structure will automatically be visible for the users. In its preferred version, the generation of the pages is based on the XML/XSL technology, although HTML or any other suitable markup language could be used.

Figure 1B:
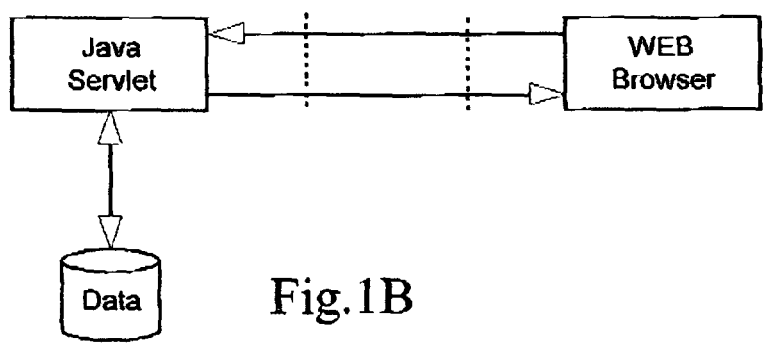
FIG. 1B is a schematic diagram showing the dynamic generation of a webpage using a servlet.

Referring now to FIGS. 1A and 1B, the method is enabled through communication via the Internet. The routine Internet communication involved in the invention is as follows. In a first step 12, the user asks that a page of the RFP be presented.

In a second step 14, the request is interpreted by an associated "servlet" (i.e., an applet that runs on the server side—without a face which is server- and platform-independent), initiating the necessary queries in order to retrieve the next questions from the database. In this step, the server generates XML code by following a predefined XML syntax, which is processed through an XSL script. In a third step 16, an HTML page is consequently generated from the XML/XSL data and sent by the servlet to the client.

Live Mandates:

With the function referred to as "live mandates", the manager is provided with a mechanism allowing him to access a web page on which are found descriptions of all the mandates that are proposed by Sponsors who are subscribers to the system. The manager can therefore study every mandate description in order to choose those to whom he can offer his portfolio management services. Each time a mandate is chosen, the manager can access an on-line questionnaire (RFP) which corresponds to the selected mandate.

The mandates are stored in the central database. The RFP is presented to the manager in the same way as described in FIGS. 1A and 1B. The list of mandates is described in XML syntax.

Referring to FIG. 2, an example of XML syntax 20 is provided. XSL scripts are used to transform XML description into web pages, which are sent to the manager.

Referring to FIG. 3, an example of a web page interface 22 sent to a manager is shown. In this example, the page presents a list 24 of actual RFPs or mandates in the system. By pushing the "select" button 26, the RFP related to this mandate will be retrieved and presented to the user.

On-Line RFP:

The on-line RFP is comprised of a set of Sponsor-proposed questions concerning the mandate. The manager must answer each question and this data will be used by the System as input for the analysis resulting in the choice of the "best" candidates.

The RFP is composed of several modules. Each of these modules corresponds to a logically independent portion of the RFP. For example, one module deals with the costs of management, another module concerns the investment style and a third one addresses performance and so on.

Figure 4:
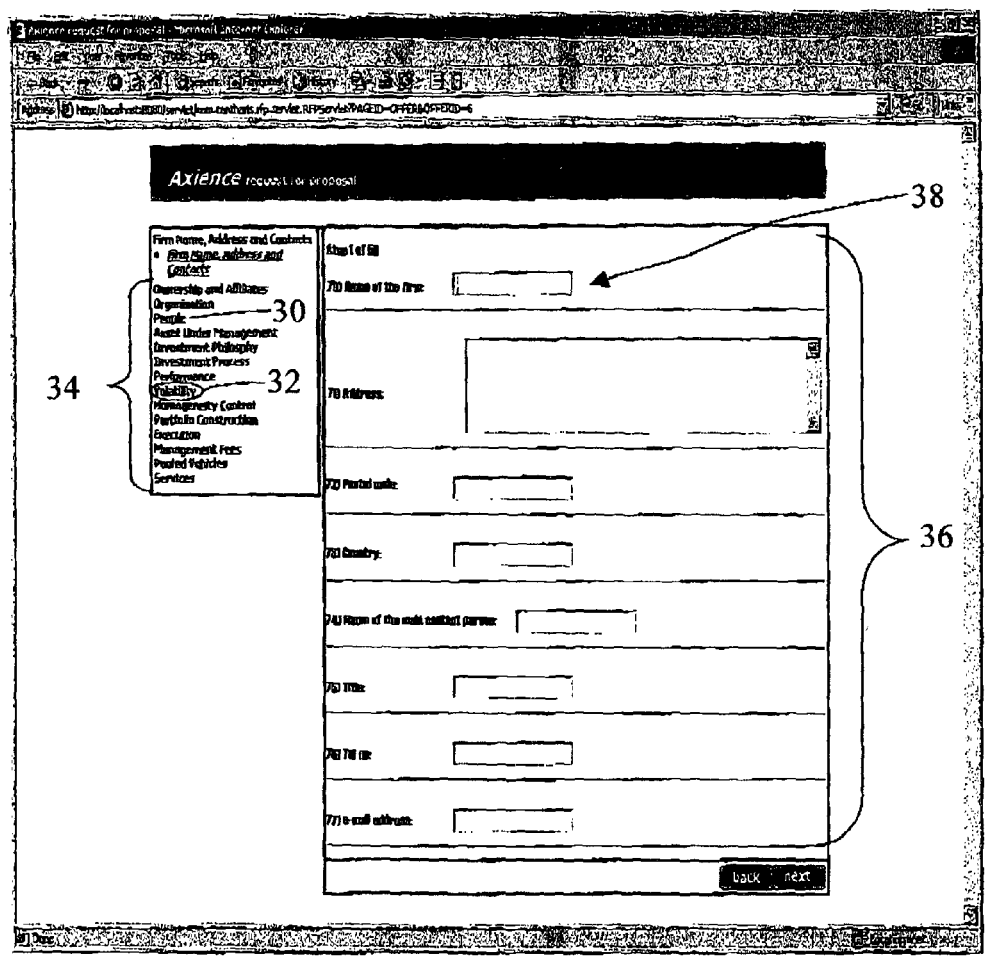
FIG. 4 shows a web menu of the invention which describes modules by name.

Referring now to FIG. 4, these modules are presented to the manager as a web menu 30 where each module 32 is described by its name. This menu 30 is typically a vertical list 34 of names, with each name reacting to mouse-clicks (e.g., hypertext links).

Referring now to FIG. 5, an XML sequence 40 is shown which describes the different modules m the menu.

Referring again to FIG. 4, the parsing of this XML by a specific XSL script gives the dynamic HTML menu 30 on the left of the figure. The manager can select each module 32 independently. When selected, the site displays the RFP 36 in the form of a list of questions associated with the module 32. The menu 30 presenting the module list 34 remains visible at all times.

The manager can either work on a single module 32 until all questions are answered or select several modules sequentially and work on them in parallel. In fact, each module 32 can even be answered by a different person in the same organization.

Once a module 32 is selected, the manager can work on the questions displayed on the web page. The questions can solicit different types of responses such as free text numbers, Booleans, grids, etc. A response area adapted to the response type is associated with each question.

Each individual question 38 has a specific XML syntax that describes all the related information. By parsing this XML through a specific XSL script, the HTML code for a question is generated. Further, there are three different types of questions displayed on the web pages:

(1) Atomic questions 50, "atomic" meaning that the question has one answer (See FIG. 6);

(2) Vector questions 60, "vector" meaning that the question can have a set of possible answers (See FIG. 7); and (3) Matrix questions 70, "matrix" meaning that the user has to complete a bi-dimensional structure (Sec FIG. 8).

In many cases, the method proposes a set of possible answers to a question (i.e., multiple choice). These suggested answers can be accessed by activating a user-interface icon or device such as by hovering the mouse arrow over the text of the questions. The suggestions are then displayed in a small, pop-down menu. The manager then scrolls through these possibilities and chooses one of them via a mouse-click, the answer being automatically submitted as a response.

This pop-down response capability is very important as many of the questions of requests for proposals (RFPs) are designed to have standard responses. The use of these suggested responses allows an important gain of time for the managers and a more efficient processing by the System.

Further, it is very important that all managers responding to the RFP have a proper understanding of the questions. Therefore, each of the technical or financial concepts appearing in a question is accompanied by a precise definition. For example, each of these concepts may appear in a particular font on the screen (e.g. italic) indicating to the manager that a precise definition is available. By mouse-clicking on each of these concepts, a pop-up menu containing the explanation and examples appears. Once the manager is finished reading the definition, he can close the pop-up menu and continue his work on the RFP.

Most questions appearing in the modules are completed in this way. Once all questions of a module are answered, an "OK" symbol appears next to the module name in the menu 30. In this way, a manager can track progress of his work in one glance.

Storing RFP:

The answering to an RFP can be a unpleasant, arduous work. Ways that the System can ease this burden have already been described, for example, by proposing standard responses whenever possible.

In another advantage, the System allows a manager to store his RFP together with his answers. To do so, he chooses the storing functionality available in the Site's menu, needing only give a name to his RFP (the Site will automatically add the mandate type, the name of the manager organization and all other important information to RFP). By doing so, the RFP is securely transmitted to the Site center (the database shown in FIG. 1B) where it is stored for later retrieval by the manager.

This storing function is an important time saver for the manager. In fact, many mandates proposed by different sponsors are very similar. Hence, many of the questions are common to all mandates and therefore, the manager will give the same answers to those common questions. By storing the RFP and the responses, the manager is able to use it for more than one mandate and gain valuable time.

If the manager is engaged in the answering process to RFPs concerning different types of mandates, he can also store more than one RFP. Typically, he will store an RFP for each type of mandate. Further, the saved responses can be stored according to a published taxonomy and be published as a standard response to a type A, B, or C (etc) Sponsor questionnaire, for example.

The manager can store the RFP at any stage of his work. He can therefore store an unfinished RFP temporarily. In this way, he can adapt work on the RFP to his availability for such purpose. Moreover, this provides the opportunity to share the work between several employees within the same organization. In fact, as soon as two or more people in the same organization are provided with access rights to the System, they can access and work on the RFP separately, each one completing a different module for example.

Loading RFP:

At any time, the manager can load an RFP he has stored on the system. To do so, he activates a "load RFP" function. A list of RFPs stored by himself or his organization appears. This list contains the name and the mandate type of each RFPs. The manager can then choose one of them. In this case, the RFP is made available in a new window. The manager can therefore work on an empty RFP and consult the RFP that he has uploaded at the same time.

The manager can modify information in the uploaded RIP and then store it, updating it in this way or changing its name and creating a new copy of the RFP.

Submitting RFP:

The manager can store his RFP at any tune even when the latter is not completed. By submitting a RFP, the manager indicates that the RFP is completed and that it can be processed by the system in order to find the best manager for the Sponsor. In other words, once the RFP is submitted, the manager enters the race for selection.

To submit his RFP, the manager activates the corresponding function in a system menu and requests submission. The site generates then a timestamp and a virtual receipt indicating the precise date on which the RFP is submitted.

Sponsor Side

To specify the type of mandate he would like to place, the Sponsor is provided with a custom interface allowing him to specify the characteristics of the mandate he intends to offer.

Once the site has received all the RFPs submitted by managers, the System processes this information in order to select the best candidates.

The Sponsor then accesses another interface presented by the system allowing him to review the results, including a classification of the managers who have bid for the mandate.

The system presents the sponsor with a number of 2-dimensional, radar-type graphics in which each manager or portfolio management firm is represented by a point. The Sponsor can easily access the definition and the interpretation of each category. He can also easily switch between one graphic and another. Through such manipulation, he can easily see where each manager stands compared to other bidders.

Data Flow

Figure 9:
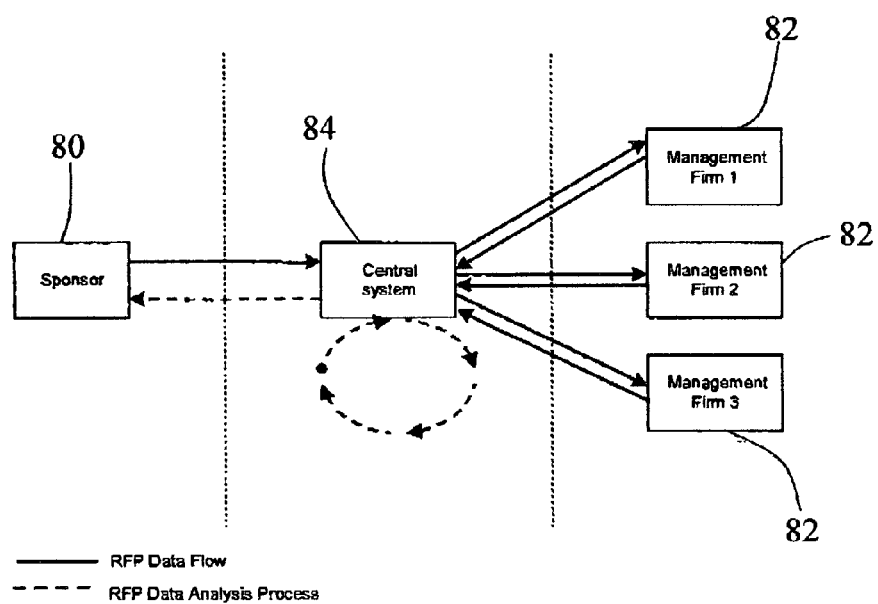
FIGS. 9 and 10 presents the actors and the data flow of the System of the invention.
Figure 10:
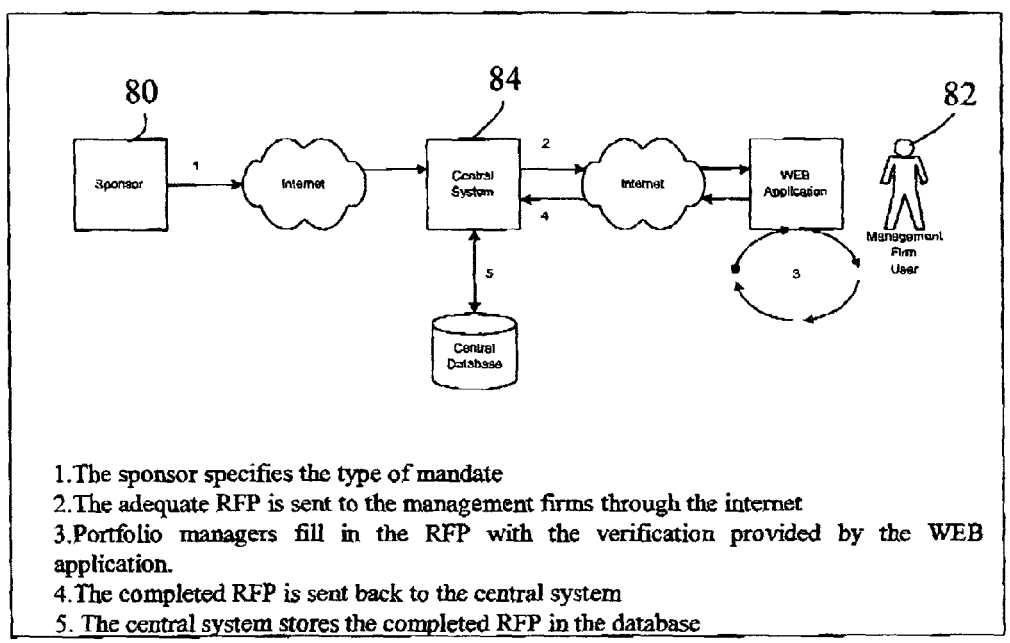

Now referring to FIGS. 9 and 10, the actors and the data flow of the System 84 of the invention are presented.

As mentioned above, the actors include the Sponsor 80 and manager or portfolio management firm 82. The Sponsor 80 specifies a mandate type concerning the management of financial assets and is in search of the best candidates to manage this mandate. The portfolio management firms 82 are interested in the management of the above mandate.

Referring again to FIG. 10, data flow between these actors and the System 84 is shown. The web-based interface 22 plays a major role in this data flow. For example, via the web-based interface 22, the Sponsor 80 accesses the System 84 in order to submit one or several different mandates. By using a custom web interface 22, he is able to specify such information as the currency, the size of the portfolio to be managed, and the type of mandate, etc.

Managers 82 can request the presentation of an overview of the mandates currently being offered via a mouse click. When a manager 82 chooses a particular mandate, the corresponding RFP is transmitted to him via his secure Internet connection.

The manager 82 completes the RFP as described above, using the modular properties of the RFP as well as the storage or caching fictions of the system until his work is finished. The completed RFP is then sent back to the System where it is stored in a central database.

Figure 11:
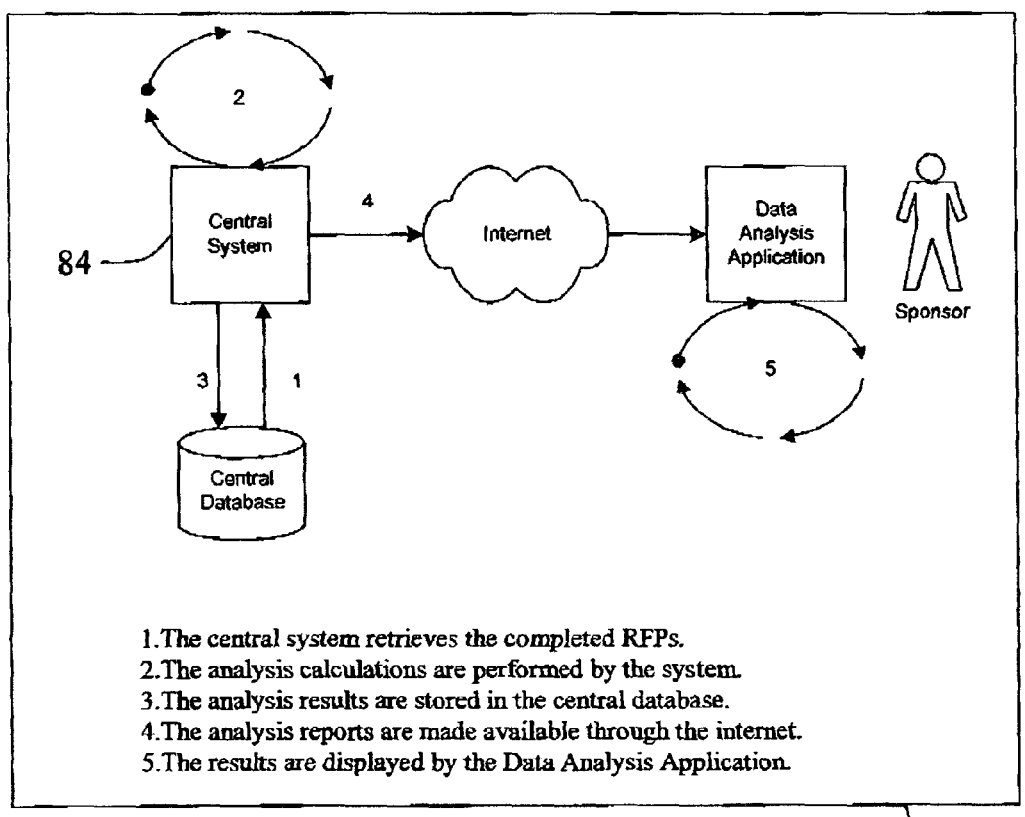
FIG. 11 presents data flow subsequent to the stage described in FIGS. 9 and 10.

Referring to FIG. 11, the data flow after this first stage 90 is presented. When all RFPs are submitted for a given mandate (determined by a time deadline or by a minimum number of bids, for example), the System 84 processes them and automatically analyses them using the artificial intelligence and data mining algorithms of the invention.

The result of this analysis is stored by the System 84 and sent to the Sponsor 80. He can then use a Data Analysis Application ("DAA") that allows him to review the analysis by using simple and graphical tools. The DAA presents a basic classification of the managers 82 in different categories with a ranking of their capabilities. These categories and ranking are then presented as output in comprehensive, mostly graphical form.

Methodology of Manager Selection

The Request For Proposal (RFP)

The RFP contains an large number of questions (more than 200) concerning important aspects that might interest the Sponsor in his selection of a portfolio manager. These aspects are for example, history of the organization, number of employees, management style, technical management tools used, costs, historical performances etc.

Benefiting from significant experience and how-how of its authors in the field of portfolio manager search, the FP of the invention has several impost characteristics. The RFP is structured in separate chapters, each one concerning an independent aspect of the portfolio management organization and techniques. The logical independence of these chapters allows the parallel completion of the RFP by the managers and provides a logical structure and modularity to the RFP. The RFP is designed for global balanced mandates, specialist mandates in equities or bonds or hedge finds for domestic as well as international assets. Open questions are avoided by design, in order to "guide" the manager toward providing two types of responses:

quantified information: in this case, the question has an quantified response (number, percentage . . . ) or an answer in the form of Yes/No; and Non-quantified information: When the response in not quantifiable, a set of possible answers in proposed to the manager (multiple choice).

Finally, in some cases, the expected answer will be purely textual with the manager providing an ad hoc response. However, a majority of the questions are quantified or multiple choice, thus allowing standardization of the responses which is an important condition for the further processing of the RFP by the System.

It is important to note that the portfolio management industry is constantly in development and mutation. Therefore, the RFP and its questions are naturally susceptible to evolution with addition of new questions or deletion of existing ones designed, for example, to consider new trends in this industry.

Dimensions and Sub-Dimensions

Each question in the RFP concerns a precise piece of information concerning the portfolio management organization and techniques. For example, the year of foundation of the organization, the cost structure, the qualifications of the CEO, the usage of a particular type of investment vehicle etc. are examples of the information solicited.

The RFP draws a broad picture of the organization using important bits of elementary information that is very difficult to synthesize by merely reading it.

In practice, the choice of a portfolio management organization is carried out by taking into account high-level concepts such as the "security of the organization", "professionalism", "transparency", etc.

We call each of these concepts a "dimension". This term is chosen because each of these concepts represents a particular dimension of the analysis of the RFP. For the choice of the portfolio manager, a value must be given to each dimension and their combination leads to the qualification of the portfolio management organization.

Therefore, each dimension corresponds to a high level concept used in the choice of the portfolio managers. Some of these concepts ale easier to define than others that are more complex. Hence, some particular concepts are made of sub-concepts that provide a more precise description. In the same way, some dimensions are composed of sub-dimensions. In other words, these dimensions are defined by the combination of several sub-dimensions.

The following example can illustrate this fact. We have defined the dimension "Professionalism of the portfolio manager". Clearly, the concept of professionalism is a complex one and comprises various aspects. We have therefore designed the 5 sub-dimensions for this dimension that follow:
Years of experience
Academic background
Financial specialization
Hierarchical responsibility
Reasonable workload The dimensions and sub-dimensions of the System of the invention are the following:

| | Dimensions | Sub-dimensions |
|---|---|---|
| $D_1$ | Perennity | Participation in other companies |
| | | Years of history |
| | | Rating |
| | | Number of different activities |
| | | Insurance |
| | | Number of employees |
| | | Assets under management |
| $D_2$ | Cost | |
| $D_3$ | Transparency | |
| $D_4$ | Security | Volatility measurement |
| $D_5$ | Historical success (marketing) | Variation in number of mandates |
| | | Variation in assets under management |
| $D_6$ | Performance of composite | Performance of the composite |
| | | Reliability of the composite |
| $D_7$ | Professionalism of organization | Volatility measurement |
| $D_8$ | Stability of organization | |
| $D_9$ | Professionalism of portfolio manager | Years of experience |
| | | Academic background |
| | | Financial specialization |
| | | Hierarchical responsibility |
| | | Reasonable work load |
| $D_{10}$ | Non conflict of interest | |

Of course, the number of dimensions or sub-dimensions in the System may be increased or decreased in the future.

Each dimension is normalized, i.e. it can have a value between 0 and 1. As each dimension corresponds to a "positive" type of concept, the higher the value of a dimension, the better. For example, a value of 0.8 for $D_4$ represents a higher security than a value of 0.2.

Figure 12:
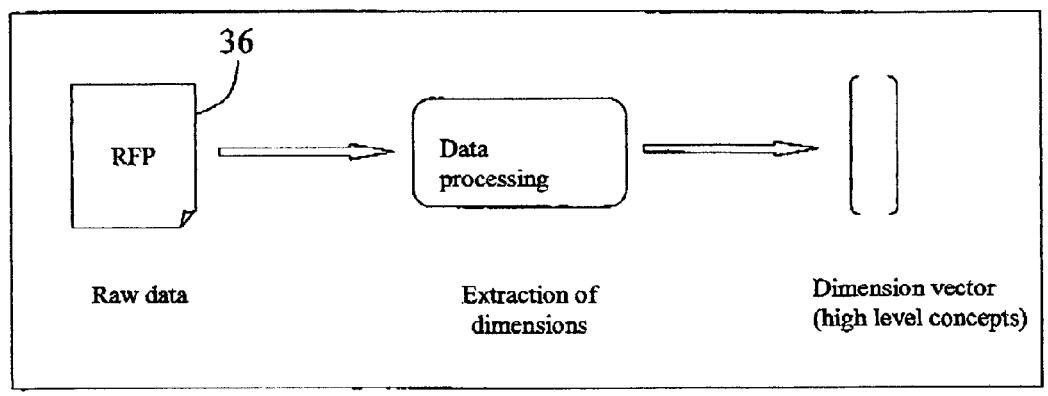
FIG. 12 shows RFP processing in order to transform the raw data it contains into higher-level concepts corresponding to dimensions.

Referring now to FIG. 12, the RFP 36 is processed in order to transform the raw data it contains into higher-level concepts corresponding to dimensions. The data processing step in this figure is carried out by a neural network.

Data Processing Module
Artificial Neuron

Neural networks are one of systems that belong to the artificial intelligence domain. They are designed to model the structure and behaviour of human intelligence.

Figure 13:
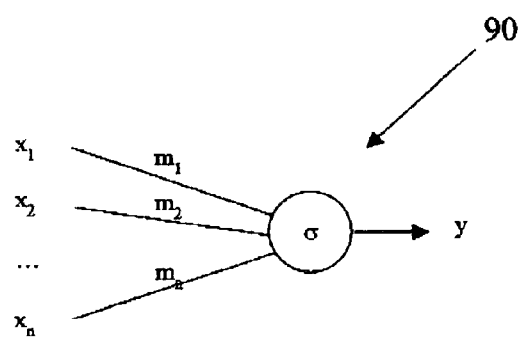
FIG. 13 shows an artificial neuron used in the System of the invention.

Referring now to FIG. 13, an artificial neuron 90 is shown as used in the System 84 of the invention. Here, $x_1, x_2 \ldots x_n$ are the inputs of the neuron 90. They can be grouped in the vector x which is called the input vector of the neuron 90.

Variables $m_1, m_2 \ldots m_n$ are called the synaptic weights of the neuron 90. Their collection is named the synaptic vector m. Now referring to FIGS. 13 and 14, the output of the neuron y, is the average sum of the inputs (or the dot product of the input and the synaptic vectors) processed through the sigmoid function s.

Figure 14A:
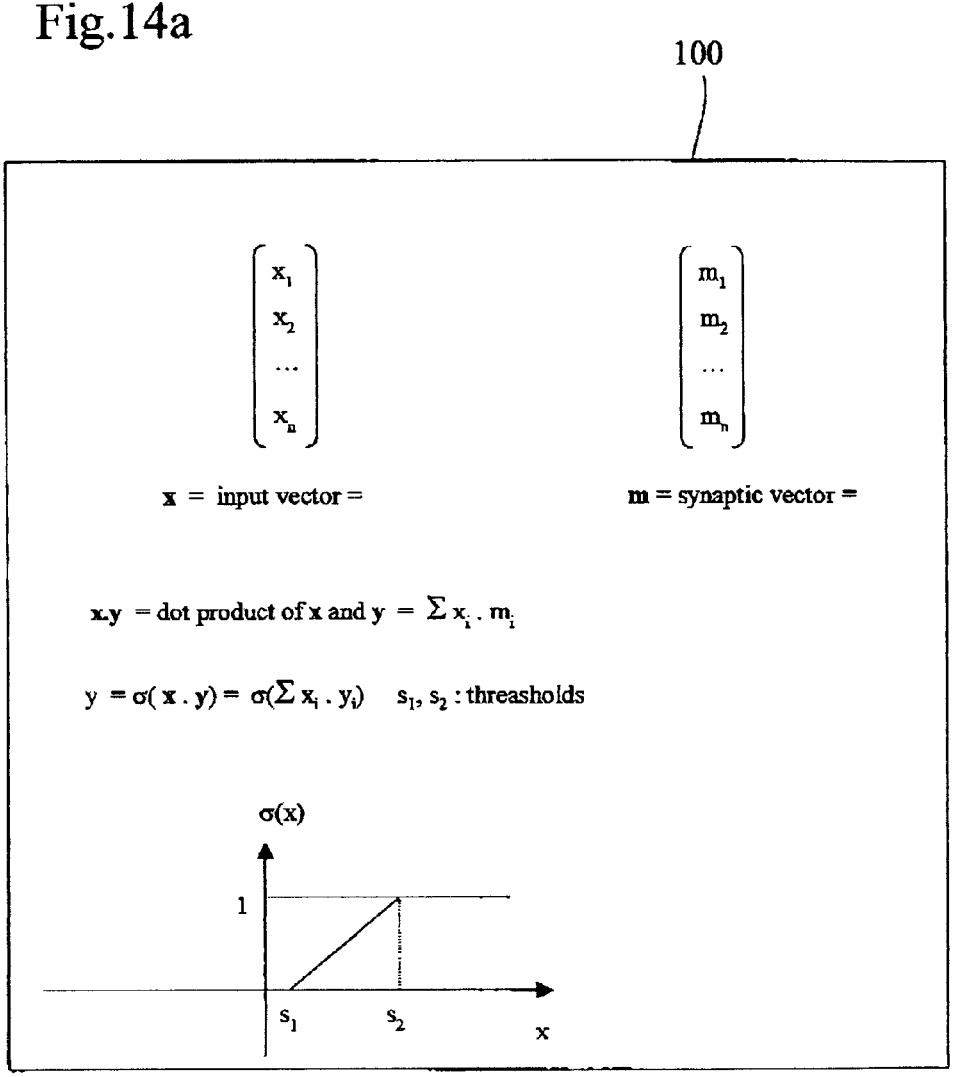
FIG. 14a shows the output of the neuron y as the average sum of the inputs (or the dot product of the input and the synaptic vectors) processed through a sigmoid function having specific properties.

The sigmoid function 100 of FIG. 14a has the following properties:
for x smaller than $s_1$ (the first threshold), the output y is zero;
for x between $s_1$ and $s_2$ (the second threshold), the output is equal to x; and
for x larger than $s_2$, the output is equal to 1

Therefore, the sigmoid function 100 normalizes the output of the neuron 90 between 0 and 1. Moreover, the output of the neuron 90 is equal to the weighted sum of the inputs if the latter is between the two thresholds $s_1$ and $s_2$.

The role of the synaptic vector is of significant importance. The synaptic weight of each input $x_1$ defines the influence of his input in the final output of the neuron. When the synaptic weight of a given input is small, the value of this input does not import much in the output of the neuron. When this weight is large, his input influences the output of the neuron much more.

The thresholds in the sigmoid functions in the neurons are also important. The value of the thresholds depends on the range of the dot product of the synaptic and the input.

Filtering the RFP Responses

Figure 14B:
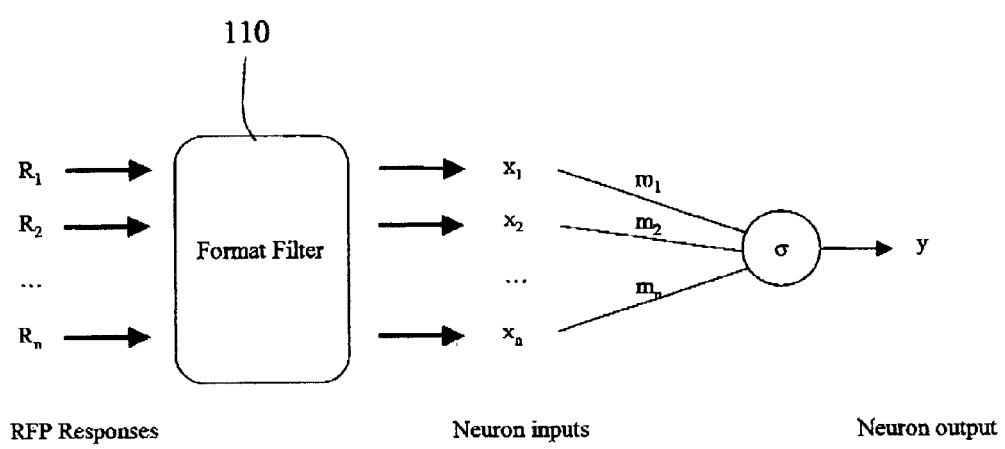
FIG. 14b shows a Format Filter of the invention.

The inputs of the neurons 90 used in our DPM are the responses in the RFP. However, in some cases, the responses cannot be input as such but must first go through the Format Filter 110 as represented in FIG. 14b.

The Format filter 110 has a role of formatting the response in order to provide a purely quantitative input to neurons 90 of the DPM.

Mainly, the filtering involves translating the responses in the form of Yes or No into 1 or 0. In some cases, the filtering can be more complex but these cases are rare.

Calculation of Dimensions

Figure 15:
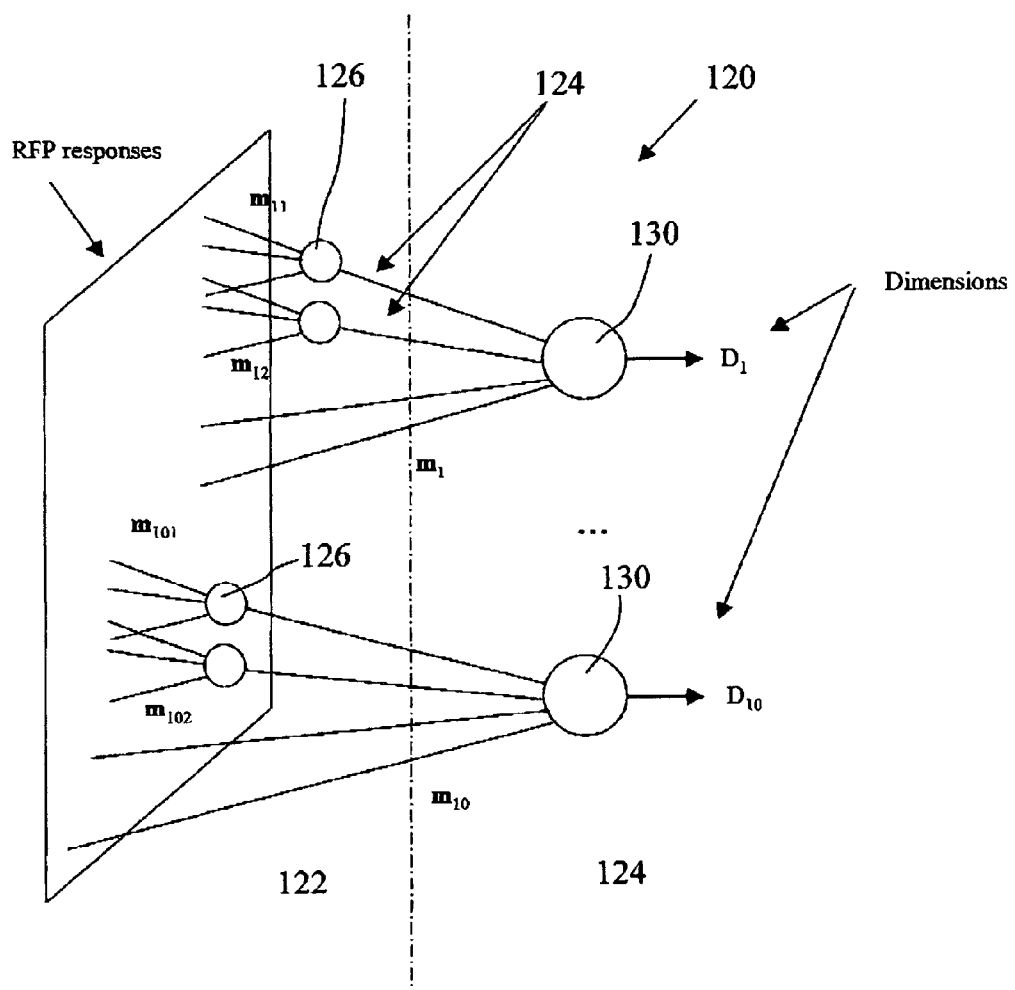
FIG. 15 is a schematic of the dimension calculation carried out by the neural network of the DPM.

Referring now to FIG. 15, a schematic of the dimension calculation carried out by the neural network 120 of the DPM is shown.

The neural network 120 is composed of two layers 122 and 124. The first layer 122 contains neurons 126 that are responsible for the calculation of the sub-dimensions 124. The neurons 130 of the second layer 124 calculate the value of the dimensions.

The input of each neuron 130 of the second layer 124 is either the output of a neuron 126 of the first layer 122 or directly a response on the RFP. The inputs of the neurons 126 of the first layer 122 are only the responses on the RFP.

Each neuron 90 is characterized by a synaptic vector and, because of the sigmoid function 100, the output of all neurons takes a value between 0 and 1.

As is apparent, each dimension (and sub-dimension) captures a high level concept such as "Security" or "Professionalism of the organization". The value given to any dimension depends on the responses to various questions in the RFP. For example, the dimension capturing "Security" is linked to questions regarding the existence or non-existence of insurance, the methodology of risk calculation, the decision making process in the organization, etc. The combination of responses given to each of these questions must be used to calculate a value for the dimension "Security".

For these reasons, the neuron 90 dedicated to the calculation of this dimension "Security" has inputs comprising responses to this type of question. The synaptic weights chosen for this neuron 90 represent the relative importance given to each answer and the way to combine them to calculate the value of the dimension. For example, if the existence of insurance in our example is perceived to be very important, the synaptic weight assigned to this input will be higher than the synaptic weight of the input concerning the methodology of risk calculation.

Hence, there are two levels of knowledge in each neuron 90. First the characterization of its inputs corresponds to those questions (and their answers) that must be taken into account for calculating a value for a given dimension. Second, the synaptic weightings assigned to the neuron 90 correspond to the relative importance given to each piece of information contained in the inputs of the neuron.

When a neuron 90 is dedicated to a sub-dimension, its output is calculated in the same way as mentioned above. The output of this neuron 126 is then considered as an input for the neuron 130 assigned to the calculation of the dimension to which this sub-dimension belongs. Therefore, the neuron 130 dedicated to the dimension has inputs coming not only directly from the RFP but also from an input that is the output of another neuron 126. This input coming from another neuron 126 is also associated with a synaptic weight that represents the relative importance of the sub-dimension compared to the other inputs of the neuron calculating the dimension.

Finally, referring again to FIG. 15, a simplified image of the data processing neural network 120 is shown. This neural network 120 is defined by the type of connections existing between, on the one hand, the neurons 90 and, on the other hand between each neuron and the questions on the RFP. This connection scheme is the first level of knowledge used in the processing of the RFP. This neural network 120 is also defined by the synaptic vectors associated with each neuron 90. The synaptic weightings represent the calculation made on the responses in order to produce sub-dimensions and dimensions. Therefore, these synaptic vectors represent the second level of knowledge.

The connection scheme and the synaptic vectors of the neural network transform an RFP which is long list of questions into ten values between 0 and 1, each representing a dimension. The higher the value of a dimension, the more vivid the corresponding concept.

Figure 16:
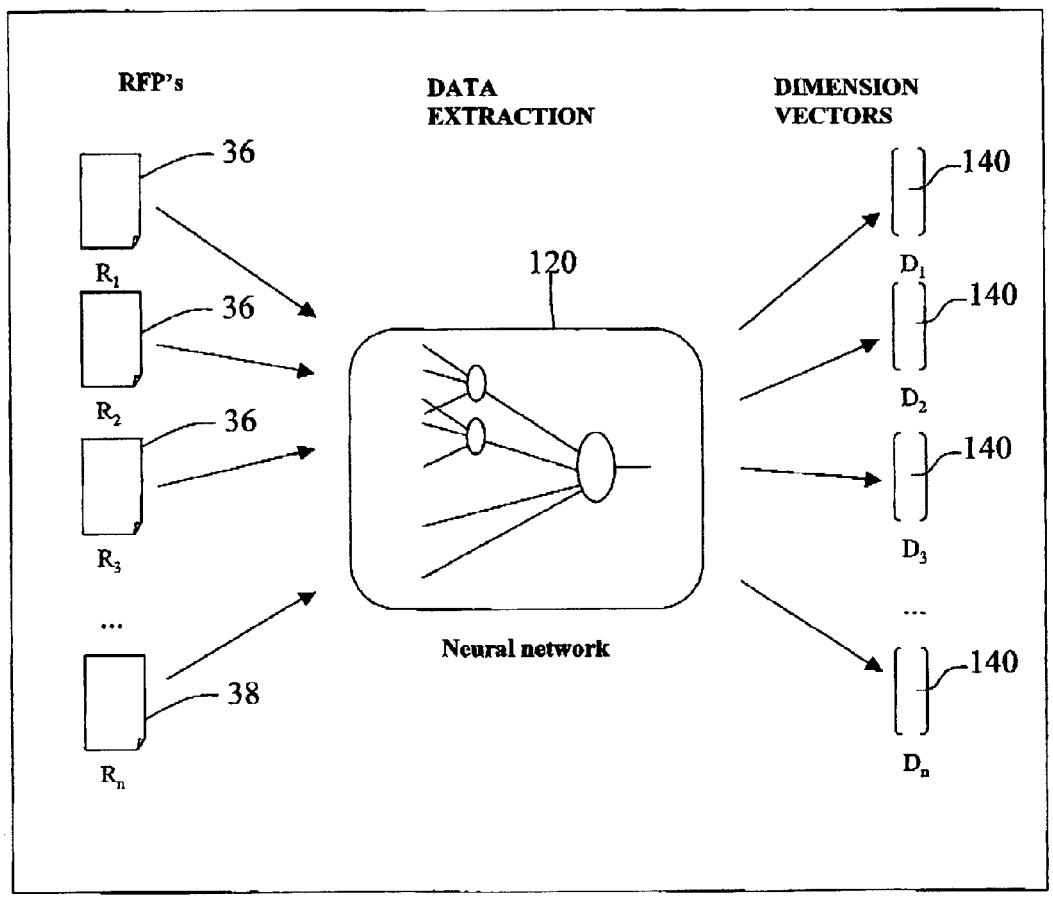
FIG. 16 shows the processing carried out for the totality of RFPs received by the System of the invention.

The collection of these 10 dimensions composes a vector that we call the Dimension Vector.
The Firm Space
Processing of Multiple RFPs The transformation of a single RFP processed by the DPM into a Dimension Vector has been shown. In our System we are dealing with a large number of RFPs, each one generated by a portfolio management organization. Referring now to FIG. 16, the processing carried out for the totality of RFPs 36 received by the System 84 is shown.

Each RFP is processed in the same way as explained above, namely, the neural network 120 of the DPM is "plugged into" the RFP 36 to produce a Dimension Vector 140. Naturally, the RFPs 36 are identical so far as the questions are concerned because the same RFP is sent to each organization. The differences between RFPs 36 is dependent purely on the responses received.

The connection scheme and the synaptic weightings of the neurons of the Data Processing module are constant as they do not change from one RFP 36 to another. The network 120 is sequentially plugged into each RFP 36 to produce a Dimension Vector 140.

The only difference between the processing of two RFPs 36 is the fact that because the responses are different, the inputs of the neurons 90 in the network 120 change from one case to another. The Dimension Vector 140 produced is therefore different for each RFP 36.

Referring again to FIG. 16, the sequential treatment of the RFPs produces n Dimension Vectors 140. The set of n RFPs 36 received is therefore transformed into a set of n Dimension Vectors 140.

Figure 17:
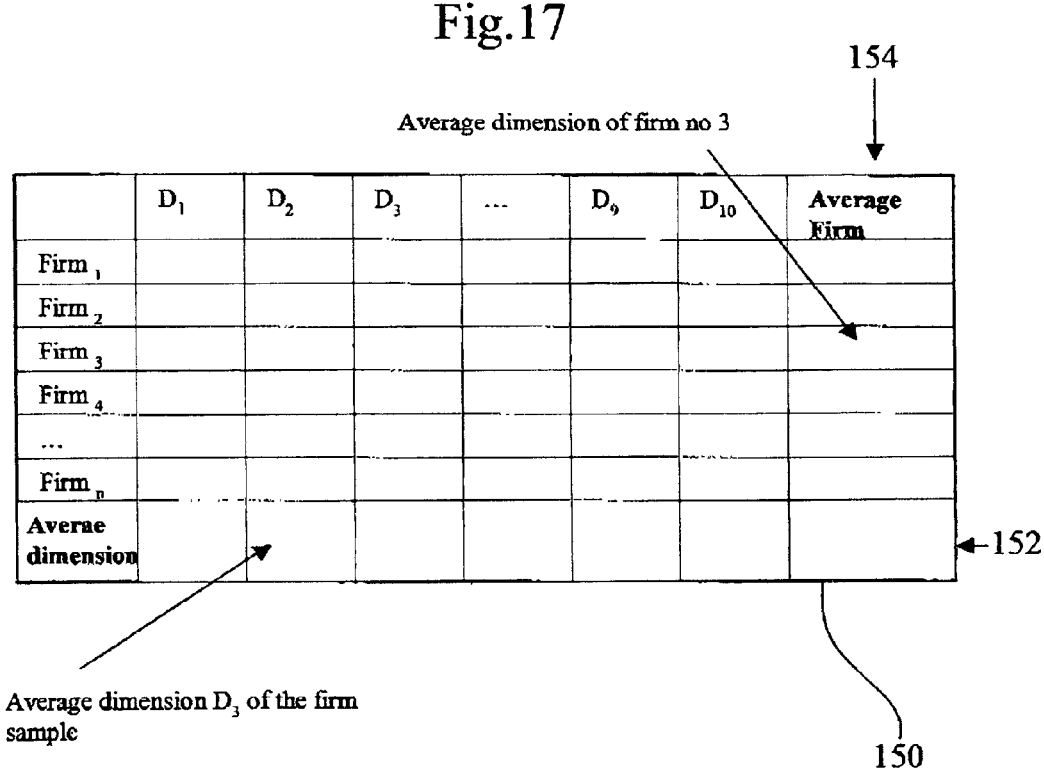
FIG. 17 shows a Dimension Matrix representing Dimension Vectors.

Referring now to FIG. 17, these Dimension Vectors 140 can be represented in the Dimension Matrix 150 shown.
Dimension Matrix In this matrix 150, each competing firm is displayed in rows 152 and the dimensions are presented in the columns 154.

The sub-dimensions are not displayed at this stage as they are used only for the calculation of the dimensions. It is however possible to access the sub-dimensions calculated for each RFP 36 and compare them if desired. In other words, a sub-Dimension Matrix can also be produced.

The last row 152 and column 154 of the Dimension Matrix 150 contains average values. The last column 154 concerns the average dimension value obtained for a given firm and the last row 152 contains the average value of each dimension for all the firms that have submitted their RFP 36.

Thus, the Dimension Matrix 150 provides a first insight into the analysis made by the System 84. It allows a visual comparison between furs 82 for a given dimension. For example, one can observe the value of the dimension "Security" for each of the firms 82 in the sample. One can also compare the average value of dimensions over the sample. This type of comparison can lead to the establishment of a ranking among firms.
Limitations of the Dimension Matrix The Dimension Matrix 150 is an intermediate tool. It has the advantage of presenting the results of the dimension analysis in a simple way and allows simple comparisons between competing firms.

The main disadvantage of the Dimension Matrix 150 is the fact that it cannot easily capture the similarity of the firms' characteristics. In fact, when the number of firms 82 is higher than 4 or 5, it is very difficult to draw a conclusion by making comparisons between the firms. In fact, one can observe easily that usually the superiority of a firm 82 in a particular dimension disappears when another dimension is considered. Therefore, ranking of the firms 82 becomes very difficult if not contradictory when all the dimensions are considered.

These disadvantages are less important when the number of dimensions is small. In these cases, one can easily establish a ranking system. However, as soon as the number of dimensions are large (as is the case in the selection of managers), the ranking systems prove to be of low utility.

The limitation of the Dimension Matrix 150 is due to the fact that it can not reveal all similarities or differences between the firms 82 in the sample. This is precisely the problem that is solved in our System 84.

The Spatial Representation of the Firms

We have seen that each RFP 36 and hence each firm 82 is represented by a Dimension Vector with 10 components. At this point the notion of dimension takes its plain meaning when one considers that each firm corresponds to a point in a 10-dimensional space.

Each of the components of the Dimension Vector of a firm 82 corresponds to a coordinate in this 10-dimensional space. Hence, the Dimension Vector of each firm 82 becomes the result of the 10 coordinates of this firm, the result defining the positioning of the firm in this space.

Figure 18:
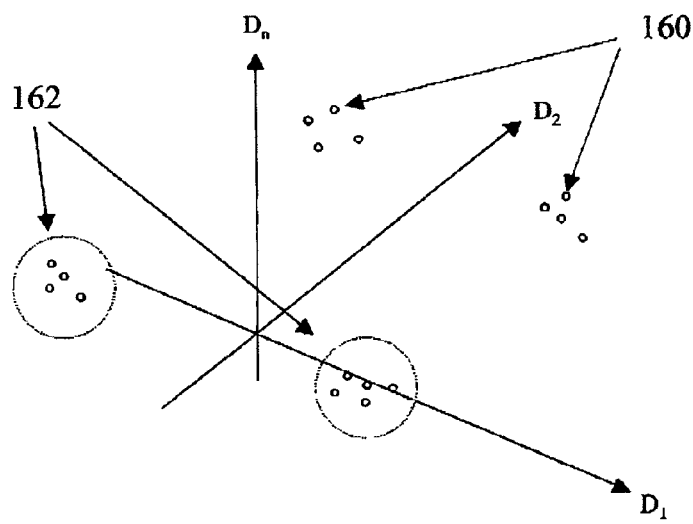
FIG. 18 shows a simplified version of the concept of a Dimension Matrix in 3-dimensional space.

Referring now to FIG. 18, a simplified version of this concept is shown in 3-dimensional space. In this simplified view, each firm 82 is characterized as a point 160 in 3 dimensions and not 10. This simplification is convenient because is it difficult to imagine spaces with dimensions greater than 3. It should be noted that FIG. 18 represents each firm 82 by a point 160 in the firm space and that some firms can agglomerate into separate "clouds" or groups 162, also referred to as a cluster.

The existence of these clusters 162 means that there are similarities between some of the firms 82 in the sample. In other words, some firms 82 are topologically close to each other whereas some others are topologically far from each other.

When the sample of RFPs 36 is processed through the prism of dimensions, clusters 162 emerge, each one representing a group of similar firms The existence of clusters 162 is made possible by the representation of the RFP 36 in the space based on multiple dimensions. The Dimension Matrix 150 and, a fortiori, the RFPs 36 alone cannot reveal these clusters 162.

The problem of qualifying portfolio management firm 82 is made easier and especially more rational by considering these clusters 162. The method 10 of the invention therefore has the following three steps:

(1) mapping competing firms 82 into multidimensional space;
(2) detection of the groups 162 in the multi-dimensional space (these groups corresponding to similar firms), and
(3) characterization or "labelling" of each group 162.

Once a group 162 is detected, it is given a label in order to differentiate it from other groups. This label describes the characteristics of the firms 82 which are members of this cluster 162.

Once these three steps are executed, the choice of the portfolio managers or firms 82 can be based on various strategic criteria. The important point is that the detection of groups 162 and their labelling lead to a choice based on a better knowledge of the firms' sample.

Detection of Clusters

The difficulty of the detection arises from the fact that visual treatment such as shown in FIG. 18 is not possible. In fact, in this figure, a 3-dimensional space is represented. Unfortunately, one cannot clearly represent a space with a number of dimension higher than 3 and, as already mentioned, the firm space is multi dimensional, involving 10 or more dimensions. Therefore, visual detection of the clusters 162 in this case is not possible.

This problem is solved using mathematical techniques which involve "projecting" a 10-dimensional space on a 2-dimensional space. We have chosen to use one of these methods called the Principal Component Analysis or PCA.

Principal Component Analysis

Figure 19:
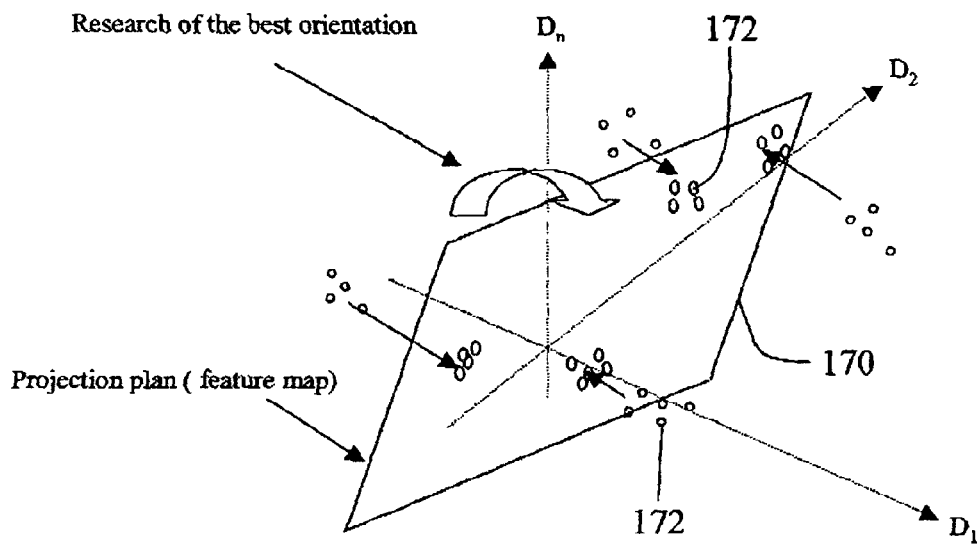
FIG. 19 shows a simplification of the PCA method used in the invention.

Referring now to FIG. 19, a simplified explanation of the PCA method is provided. We can observe on this figure our original firms space. Once more, this space is represented as a 3-dimensional space for simplification. The PCA method defines a plane that we call the Feature Map 170. Each point 172 representing a firm is then orthogonally projected on the Feature Map 170. Of course, this projection is carried out with loss of information. Points 172 that are originally far away from each other may find themselves close to each other on the Feature Map 170. However, the PCA method tries to resolve best orientation of the Feature Map 170 so that this loss of information is minimized.

Mathematically, the PCA tries to maximize the statistical dispersion of the points 172 after their projection. This statistical dispersion is also called the statistical inertia of the points 172. This means that if the dispersion of the points 172 is preserved, one can assume that the loss of information which is unavoidable in a projection is minimized.

The calculation of the orientation of the projection plan is based on the Eigenvalues of the covariance matrix of the firms' points in the 10-dimensional space. The PCA is a well known methodology and more ample information about it can be found in the scientific literature.

Figure 20:
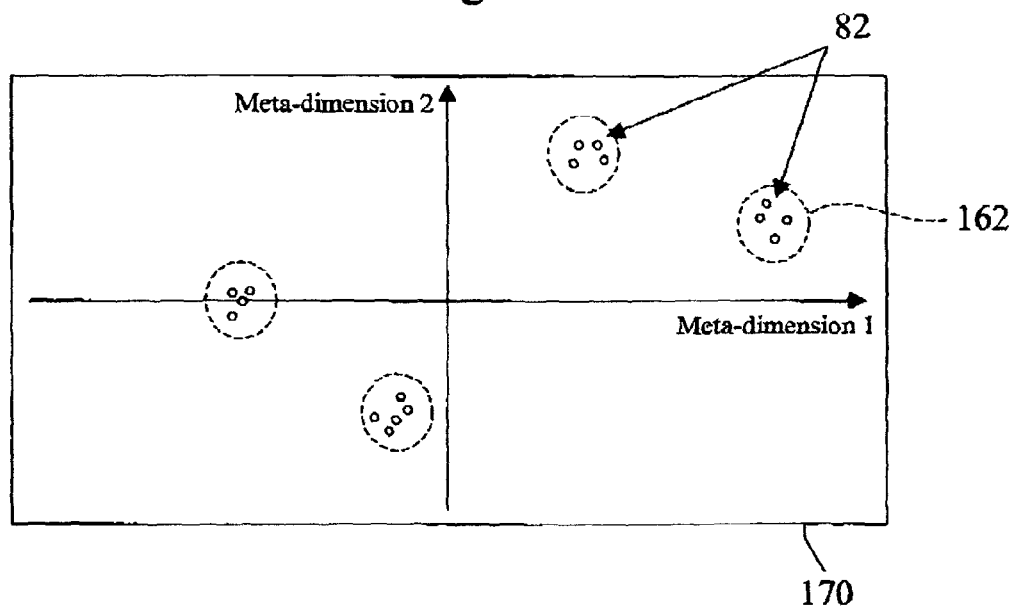
FIG. 20 shows the projection of firm Feature Map information on two dimensions.

Referring now to FIG. 20, once the Feature Map 170 is defined, the firms 82 are projected on it as shown. Therefore, the firms 82 are now presented in 2-dimensional space (a plane) and the visual detection of groups 162 is now possible.

However, a new problem arises at this stage. The horizontal and the vertical axis of the Feature Map 170 are combinations of the 10 original dimensions (this combination which is linear is calculated by the PCA). Therefore, it is not easy to express the significance of the axes referred to as meta-dimensions. The problem now is the characterization of the groups 162 that are detected on the Feature Map 170.

Labeling of the Feature Map

There ale two principal ways of handling this problem:

Centroid Method

In this method, the sample contains firms that are well known to the Sponsor 80. When one of these firms 82 is a member of a group 162 on the Feature Map 170, we call it a centroid. As the firms 82 in a same group 162 are similar to each other, we will characterize the whole group by its centroid which is well known. In other words, a group 162 is labelled by one of its known members.

This method, although very simple, bas an important caveat. Clearly, its success depends on several conditions. First, well known firms 82 must be among the sample. Second, each group 162 must contain one of these firms 82. This second condition is not required of the method of the invention.

Correlation Circle

This method starts with the consideration that each meta-dimension is a linear combination of the original dimensions. For each of these dimensions, we have the values taken by each film 82 (a column in the Dimension Matrix 150). For each meta-dimension, the values taken by each firm 82 is also available (calculated by the PCA method). The correlation circle method involves the calculation of the correlation coefficient between these two sets of values.

If the correlation between a dimension, say "Security", is high and positive with the meta-dimension 1, then it is clear that a high value of meta-dimension 1 means high Security. If the correlation between, for example Transparency, is high and negative with meta-dimension 2, then a high value of meta-dimension 2 means low Transparency, and so forth.

Figure 21:
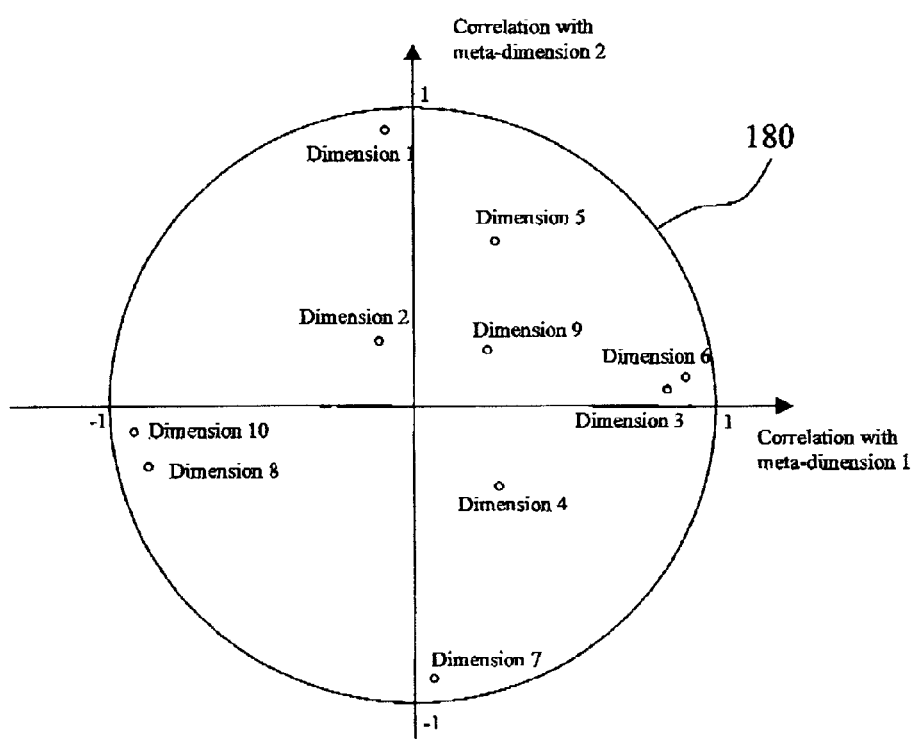
FIG. 21 shows an example correlation circle used in the invention.

The result of these calculations can best be represented on a circle, called the correlation circle. Referring now to FIG. 21, an example of a correlation circle 180 is shown. The correlation coefficient resolves to between −1 and +1. Therefore, the correlation of each dimension with meta-dimension 1 and 2 can be described by a point in the correlation circle 180.

The closest a point to the border of the circle 180, the better. In fact, when a dimension is close to a boundary of the circle 180, its correlation with the two meta-dimensions is close to +1 or −1, hence having a high significance. On the contrary, those dimensions which are placed close to the center of the circle 180 have low correlation with the meta-dimensions and have little influence on the meta-dimensions.

Figure 22:
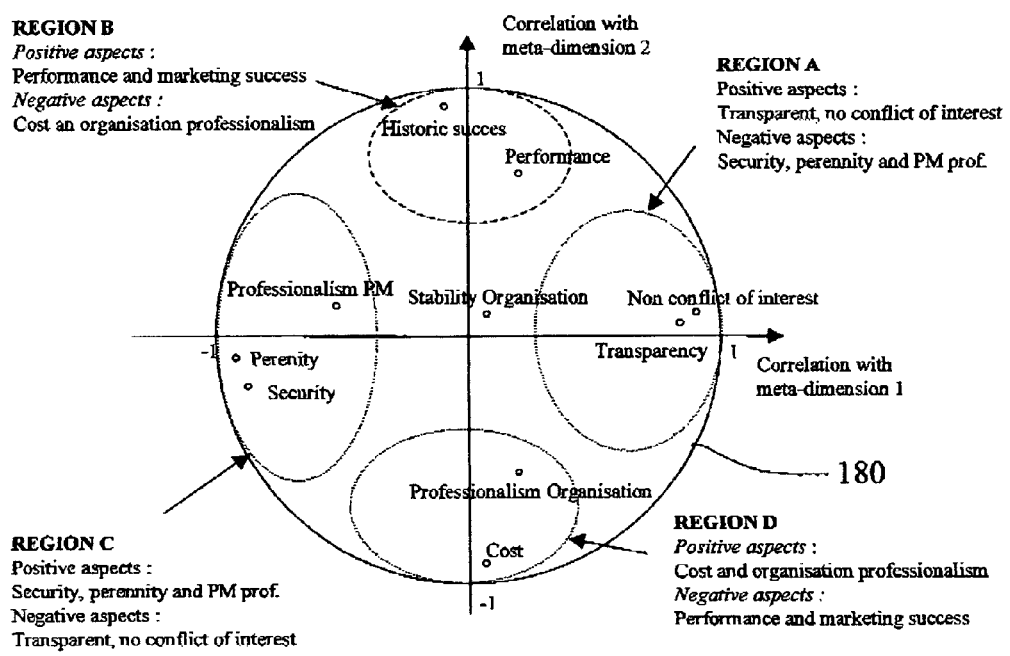
FIG. 22 shows another example of a correlation circle used in the invention.

Referring now to FIG. 22, another correlation circle 180 is shown. In this example, dimensions "Non conflict of interest" and "Transparency" show high positive correlation with meta-dimension 1. The dimensions "Perennity", "Security", and "Professionalism of PM" have a negative correlation with meta-dimension 1.

Positive correlation is observed with meta-dimension 2 for "Performance" and "Historic Success" and negative correlation with "Cost" and "Professionalism of Organization".

In this example, the correlation circle 180 can be described by four regions named A, B, C and D. Each region is defined by the correlation of dimension with meta-dimensions. For example, the region A is characterized by high "non conflict of interest" and "transparency" but low "Security", "Perennity" and "Professionalism of PM".

The Feature Map

The regions A-D defined by the correlation circle 180 can be placed on the Feature Map 170. In this way, we now have a map which, like a geographical map, presents regions with characteristic properties.

Figure 23:
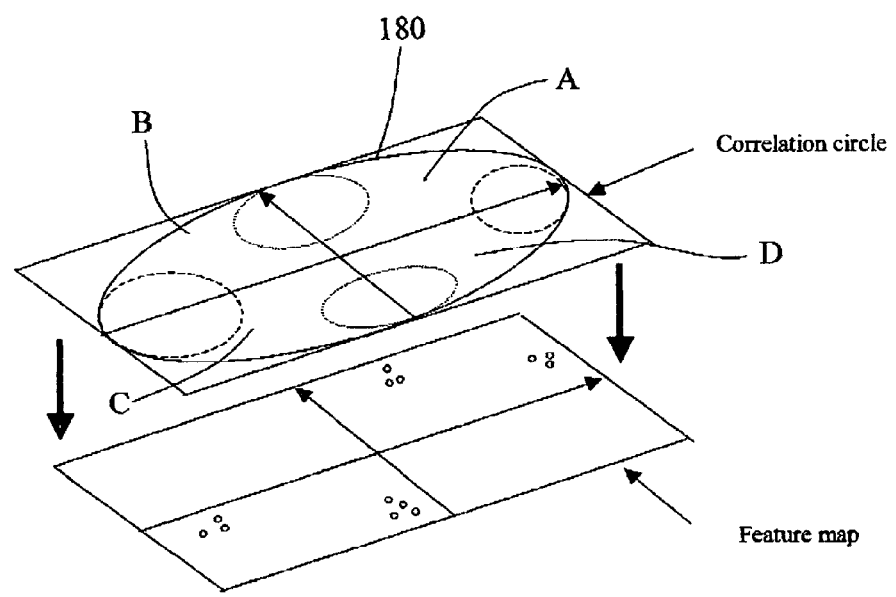
FIG. 23 shows the labelling process of the invention.

The firms 82 that are placed on this map can now be described by the characteristics of the regions in which they appear. Referring now to FIG. 23, an illustration of the labelling process is shown. It is important to note that thanks to the correlation circle 180, the properties of the regions A-D and hence those of the competing firms are expressed in terms of the dimensions.

Figure 24:
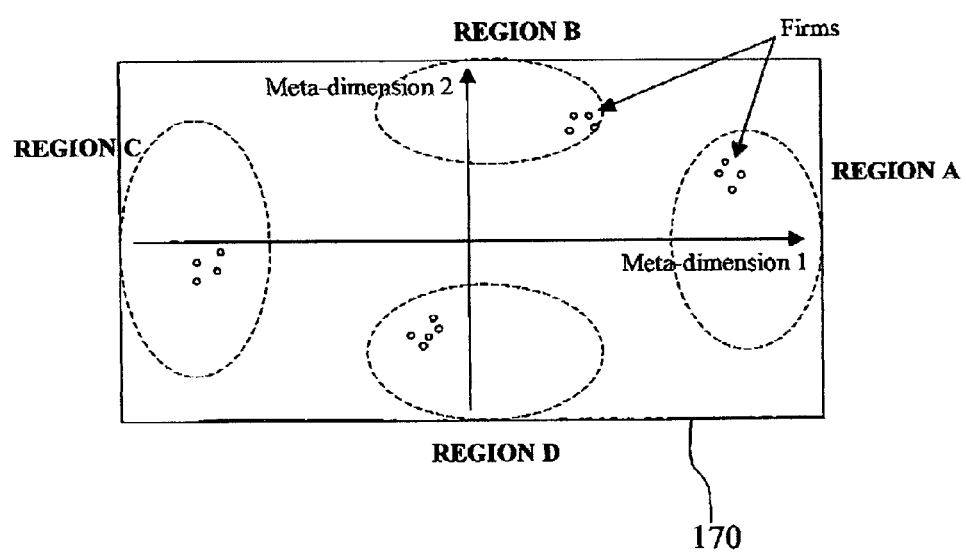
FIG. 24 shows a labelled feature map used in the invention.

Referring now to FIG. 24 an example of a labelled feature map 170 is shown.

Figure 25:
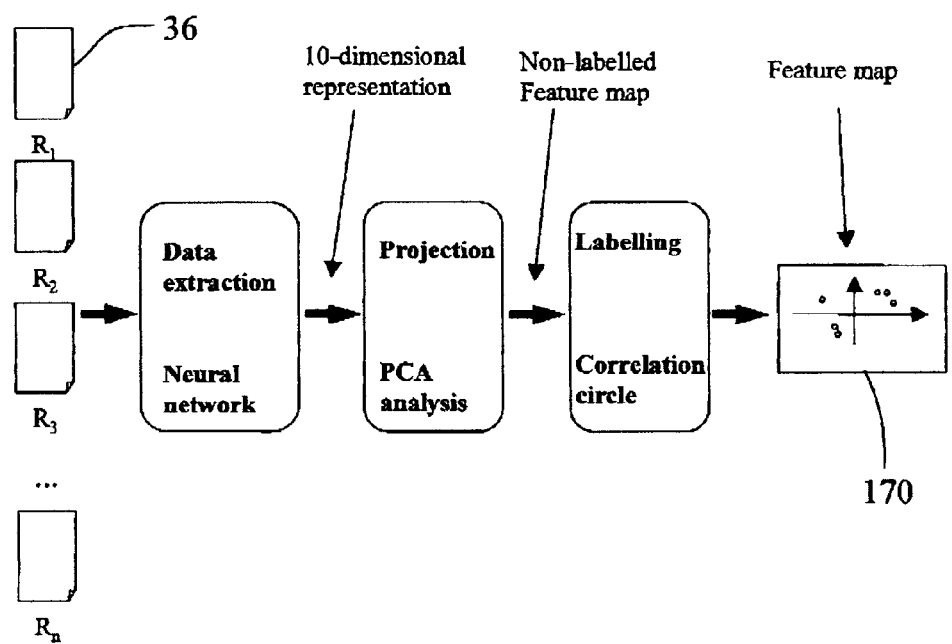
FIG. 25 a overview of the process of the invention is shown.

Referring now to FIG. 25, the whole process described in the previous pages is summarized. The RFPs, which are long lists of responses, are transformed into a map on which each firm appears. These firms may then be described by the properties of the regions to which they belong. Because this description is expressed in terms of dimensions, the choice to be made is much easier than the examination of the RFPs.

Quality of the Feature Map

Referring again to FIG. 24, the Feature Map 170 is the most useful when the projection of the dimensions leads to a number of distinct clusters 162 as the latter define well separated groups. Moreover, this also means that the firms in the same group are similar to each other.

On the contrary, if the Feature Map 170 displays clusters 162 with no clear borders between them, the choice of the firms 82 by the sponsor 80 is less efficient.

The separation of clusters 162 on the Feature Map 170 is warranted by the existence of such clusters in the original 10-dimensional space and a good projection of these data on the Feature Map.

A measure of the separation of the clusters 162 in the 10-dimensional space is the statistical inertia of the data.

Learning and Plasticity

As already explained, the calculation of dimensions is carried out by a neural network 120 characterized by the synaptic weightings of its neurons 90 (Data Processing Module or DPM). These weightings are essential because they define the way each response is considered in the calculation of dimensions.

These weightings are determined heuristically, based upon human experience in the area of qualifying portfolio managers. However, these weightings can be modified in order to change the relative importance of responses in the dimension calculation process. Naturally, these modifications will lead to new values for the dimensions and therefore, a different Feature Map 170.

The properties of the adaptation of synaptic weightings in a neural network 120 is called plasticity. This property allows neural networks 120 to demonstrate learning abilities.

In the method of the invention, the learning process can be carried out in two ways. Either it is Sponsor driven or by automatic leaning. These concepts are discussed in more detail below:

Sponsor-driven: The weightings of neurons 90 in the DPM can be modified through discussions with the Sponsor 80. The Sponsor 80 can be particularly sensitive to some aspects of the RFP. For example, he can be very interested in aspects linked with security. In this case, some related weights will be modified in order to give higher importance to these aspects. For doing so, we will set higher weightings to those questions related to these aspects. In this case, the weightings are modified heuristically. One can say that the neural network 120 is changed so as to place a particular accent on some aspects of the choice.

Automatic learning: In this case, we use learning algorithms by which the neural networks weightings are adjusted automatically. The objective of the learning is set to enhance the quality of the Feature Map 170. This quality is linked to the statistical inertia of the dimension values in the firm's space.

Inertia plays the role of an optimization criteria. The learning process can be described as follows: With a original set of weightings, the overall process illustrated in FIG. 25 is carried out and the inertia of the dimensions is calculated. A learning algorithm called the "back-propagation algorithm" is then used to modify the weightings of the neural network and the process is repeated in order to calculate a new inertia.

This process is carried out until the value of the inertia is stabilized and does not change. The set of the weightings obtained after this learning process is the one which optimizes the inertia of the dimensions. The "back-propagation algorithm" is very well known and a large amounts of literature can be found on this subject.

Use of Kohonen Network

Finally, an alternative method is useful in calculation of the Feature Map 170. Already disclosed is the calculation of this map by PCA analysis. Another method is based on the use of a neural network 120 called the Kohonen network.

Referring again to FIG. 25, the Kohonen network replaces the PCA method in the "projection" step. Dimensions are input to this network which will produce a 2-dimensional Feature Map 170. The principal of this calculation is based as well on maximum preservation of topological relationships between the dimensions in the 10-dimensional input space. However, the Kohonen network is essentially a neural network 120 and it functions on a non-algorithmic basis In sum, the use of the Kohonen network produces basically a Feature Map 170 just as the PCA method. This map is then labelled by the correlation circle 180 in the same way as described in previous paragraphs.

In an advantage of the invention, the system and method provides Sponsors the opportunity to request proposals for their mandate from a much higher number of management companies, thus increasing dramatically the efficiency and rationality of their final choice of managers.

In another advantage of the invention, groups 162 of competing firms 82 with similar attributes are mapped and identified by association with other similar firms. Thus, the selection of firms meeting a Sponsor's criteria is greatly simplified.

It should be noted that multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A computerized system encoded with a method of qualifying a portfolio management firm, the method comprising the steps of:
   (a) calculation of an at least three dimensional multi-dimensional space of points associated with characteristics of firms, the calculation using a neural network characterized by synaptic neuron weightings;
   (b) evaluation and processing of the multi-dimensional space including projecting the points in the at least three-dimensional multi-dimensional space onto a 2-dimensional space using a Kohonen network, the projecting creating a feature map, wherein firms placed on this map are described by the characteristics of the regions in which they appear on the map, thereby helping visualize the attributes of the firms;
   (c) detection of groups corresponding to firms having similar characteristics in the feature map;
   (d) labelling each group; and
applying selection criteria to qualify a firm suitable for a particular mandate, wherein the method further includes a step of transforming unstructured raw data of an RFP into a multi-dimensional space of metrics permitting a rational selection of a portfolio management firm.

2. A computerized system encoded with a method of qualifying a portfolio management firm, the method comprising the steps of:
   (a) calculation of an at least three dimensional multi-dimensional space of points associated with characteristics of firms, the calculation using a neural network characterized by synaptic neuron weightings;
   (b) evaluation and processing of the multi-dimensional space including projecting the points in the at least three-dimensional multi-dimensional space onto a 2-dimensional space using a Kohonen network, the projecting creating a feature map, wherein firms placed on this map are described by the characteristics of the regions in which they appear on the map, thereby helping visualize the attributes of the firms;
   (c) detection of groups corresponding to firms having similar characteristics in the feature map;
   (d) labelling each group; and
applying selection criteria to qualify a firm suitable for a particular mandate, wherein the method includes adaption routines that adapt the method according to a property of a neural network known as plasticity wherein synaptic weightings in the neural network demonstrate learning abilities.

3. The system of claim 1 wherein firm characteristics for calculation of the multi-dimensional space are responses by designates of firms to questions in a request for proposals for a given mandate, such responses being used to perform a calculation applying artificial intelligence and data mining techniques, the calculation resulting in a comparison of one firm with another such that a sponsor is able to more easily discern differences between offerings of one firm with another, according to requirements of his mandate.

4. The system of claim 3 wherein firm characteristics for calculation of the multi-dimensional space are responses by designates of firms to questions in a request for proposals for a given mandate, such responses being used to perform a calculation applying artificial intelligence and data mining techniques, the calculation resulting in a comparison of one firm with another such that a sponsor is able to more easily discern differences between offerings of one firm with another, according to requirements of his mandate.

5. The system f claim 3 wherein the points in the multi-dimensional space are projected onto a 2-dimensional space to better visualize the attributes of the firms.

6. The system of claim 5 wherein the projecting is based upon a Principal Component Analysis technique.

7. The system of claim 5, wherein the multi-dimensional space is a ten-dimensional space comprising ten values between 0 and 1, each value representing a dimension, wherein the higher the value of the dimension, the greater the correlation to a concept corresponding to the dimension.

8. The system of claim 7, wherein the ten-dimensional space is generated by a connection scheme and synaptic vectors of the neural network operating on responses to questions in a request for proposal.

9. The system of claim 3 wherein the method operates on a network selected from a group of networks consisting of a virtual private network, a LAN, and a distributed network known as the Internet.

10. The system of claim 1, wherein the method further includes a step of transforming-unstructured raw data of an RFP into the multi-dimensional space.

11. The system of claim 1, wherein the method includes adaption routines that adapt the method according to a property of a neural network known as plasticity wherein synaptic weightings in the neural network demonstrate learning abilities.

12. The system of claim 2, wherein the method operates on a network selected from a group of networks consisting of a virtual private network, a LAN, and a distributed network known as the Internet.

13. A service product transmittable over a network, the product being a recommendation or set of recommendations of portfolio management firms, the recommendation being obtained by applying the system of claim 1.

14. The service product of claim 13, wherein the network is a network selected from a group of networks consisting of a virtual private network, a LAN, and a distributed network known as the Internet.

15. A computerized system encoded with a method of qualifying a portfolio management firm, the method comprising the steps of:
   (a) calculation of an at least three dimensional multi-dimensional space of points associated with characteristics of firms, the calculation using a neural network characterized by synaptic neuron weightings;
   (b) evaluation and processing of the multi-dimensional space including projecting the points in the at least three-dimensional multi-dimensional space onto a 2-dimensional space using a Kohonen network, the projecting creating a feature map, wherein firms placed on this map are described by the characteristics of the regions in which they appear on the map, thereby helping visualize the attributes of the firms;

(c) detection of groups corresponding to firms having similar characteristics in the feature map;

(d) labelling each group; and applying selection criteria to qualify a firm suitable for a particular mandate, wherein, prior to calculation of a multi-dimensional space, inputs are gathered using an online questionnaire consisting of questions which are designed for automated analysis.

16. The system of claim 15, wherein the questions comprise question types selected from a group of question types consisting of atomic, vector, and matrix questions.

17. The system of claim 16, wherein answers input to the questions are savable for later retrieval by the firm being queried.

* * * * *

UNITED STATES PATENT AND TRADEMARK OFFICE
CERTIFICATE OF CORRECTION

| | |
|---|---|
| PATENT NO. | : 8,046,278 B2 |
| APPLICATION NO. | : 10/284718 |
| DATED | : October 25, 2011 |
| INVENTOR(S) | : Mohsen Sohrabi et al. |

It is certified that error appears in the above-identified patent and that said Letters Patent is hereby corrected as shown below:

In Col. 7, line 26, replace the phrase "at any tune even when the" with --at any time even when the--.

In Col. 8, line 36, replace the phrase ", the FP of the" with --, the RFP of the--.

In Col. 9, line 20, replace the phrase "these concepts ale easier" with --these concepts are easier--.

In Col. 12, line 43, replace the phrase "comparison between furs" with --comparison between firms--.

In Col. 14, line 47, replace the phrase ", bas an important" with --, has an important--.

In Col. 16, line 16, replace the phrase "automatic leaning" with --automatic learning--.

In Col. 20, line 8, replace the phrase "questions are savable" with --questions are saveable--.

Signed and Sealed this
Twentieth Day of December, 2011

David J. Kappos
*Director of the United States Patent and Trademark Office*